(No Model.) 2 Sheets—Sheet 1.
E. JARRELL.
VEHICLE SPRING.
No. 455,335. Patented July 7, 1891.
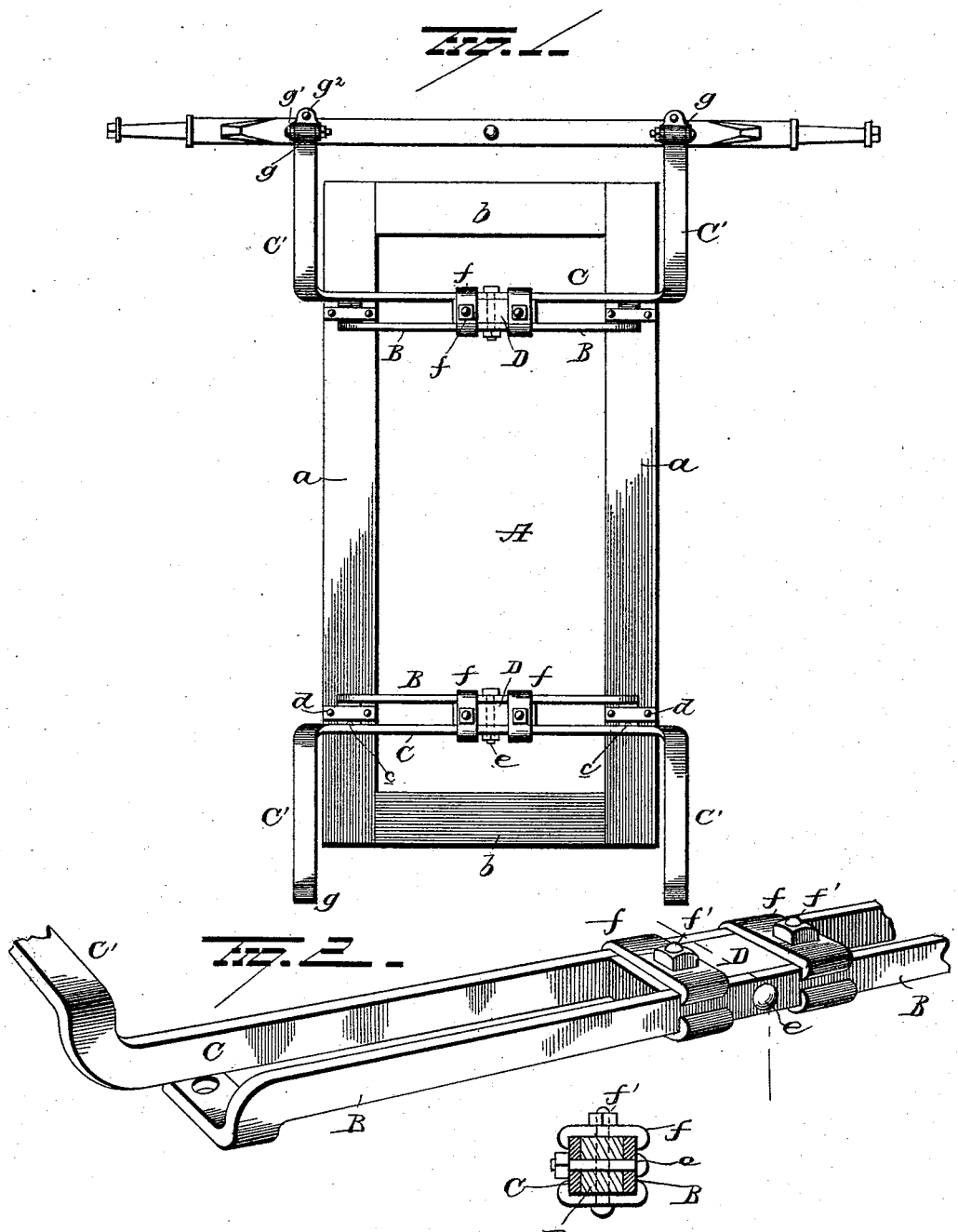
Witnesses
E. J. Nottingham
G. F. Downing
Inventor
Edwin Jarrell
By his Attorney
H. A. Seymour

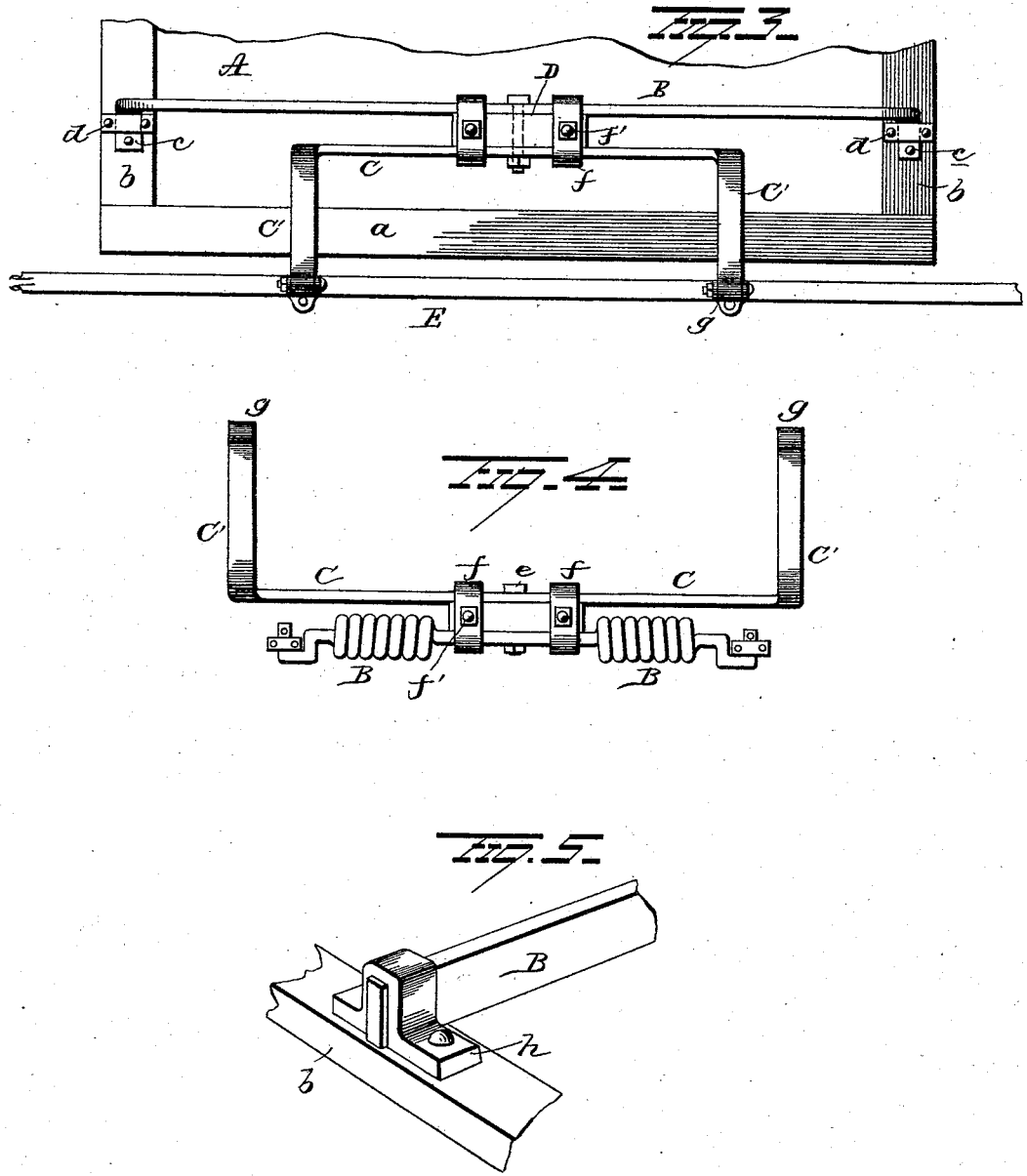

UNITED STATES PATENT OFFICE.

EDWIN JARRELL, OF HARPER, KANSAS, ASSIGNOR OF THREE-FOURTHS TO HARRY W. McMUNN, OF SAME PLACE.

VEHICLE-SPRING.

SPECIFICATION forming part of Letters Patent No. 455,335, dated July 7, 1891.

Application filed September 4, 1890. Serial No. 363,932. (No model.)

*To all whom it may concern:*

Be it known that I, EDWIN JARRELL, a citizen of the United States, residing at Harper, in the county of Harper and State of Kansas, have invented certain new and useful Improvements in Vehicle-Springs; and I do hereby declare the following to be a full, clear, and exact description of the invention, such as will enable others skilled in the art to which it appertains to make and use the same.

My invention relates to an improvement in vehicle-springs, and more particularly to that class known as "torsion-springs," its object being to provide a vehicle-spring of simple and durable construction, of slight cost, and capable of being readily attached to vehicles of various forms, and so formed as to entirely do away with journals, and also side bars when desired, and to give increased strength at points where the springs and parts are usually weak.

A further object is to so form the springs as to admit of increased spring and elastic reactionary power within a limited space.

With these objects in view the invention consists in certain novel features of construction and combinations and arrangements of parts as hereinafter set forth, and pointed out in the claims.

In the accompanying drawings, Figure 1 is a bottom plan view of a vehicle having my improvements applied thereto. Fig. 2 is a detached view of the devices for attaching the two parts of the spring together. Figs. 3, 4, and 5 are views of modifications.

A represents a vehicle-body, having side-boards $a$ and end-boards $b$. Located at points near each end of the body A are preferably flat metallic spring-bars B, which are so disposed that their flat faces shall lie at right angles to the vehicle-body, and at their ends these spring-bars B are bent downwardly and outwardly so that they shall lie flat against the side-boards $a$, to which they are secured by suitable bolts $c$, or the ends of the bars B may be twisted so that their body portions will be at right angles to the vehicle-body and their ends lie flat against the same. The springs B are further secured in place by means of metal plates adapted to straddle the ends of the bars, and these plates are secured to the side-boards $a$ by means of suitable bolts $d$. If desired, instead of making the springs B flat they may be made round or half-round, or of any other desired form.

Located parallel with the springs B and removed a short distance therefrom are springs C, which are bent outwardly at their ends to produce arms C', and are spaced a proper distance apart by means of spacing-blocks D, located between said springs B C at their centers and united by means of a bolt $e$, passing through the centers of the springs and spacing-blocks. The spacing-blocks D extend a short distance at each side of the bolts $e$, and at the ends of these blocks clips or flanged plates $f$ are made to connect or embrace the springs B C at opposite edges thereof. These clips or flanged plates are provided at their centers with perforations which align with perforations in the ends of the spacing-blocks D for the reception of tie-bolts $f'$, which unite said parts together and hold the flanged plates in place against the springs B C, thereby effectually tying said springs together. The free ends of the arms C' of the springs C are provided with loops $g$, adapted to receive pivot-pins held by ears $g'$ on clips $g^2$, which latter are secured to the axle at one end of the vehicle and at the other end of the vehicle to the head-block bolster or to a semicircular spring thereon. From this construction it will be seen that when the springs B C are brought into play they will be prevented from turning by the tie blocks or clips $f$ and the springs made to exert a torsional action. The springs B may be secured to the side-boards $a$ at any desired points between their ends and the use of side-boards dispensed with. The weight of the vehicle will be sustained edgewise of the springs, thus utilizing their full strength at or near their ends. The spreading of the springs and attached parts will be prevented, and the noise usually caused by shackles obviated.

In the form of the invention shown in Fig. 3 the ends of the springs B will be attached to the side-boards of the vehicle-body and the free ends of the arms C' of the springs C connected with side bars E, which latter are attached at their ends to the axles of the vehicle.

If desired, the ends of the springs B may be coiled, as shown in Fig. 4, whereby a long spring-bar may be employed in a limited space, whereby said spring-bars will be made more elastic.

The spring-bars B may be made straight throughout their length, if desired, and adapted to rest edgewise on the sills of the body, where they may be secured by means of inverted-U-shaped plates *h*, as shown in Fig. 5.

It is evident that slight changes might be made in the details of construction of my invention without departing from the spirit thereof or limiting its scope. Hence I do not wish to limit myself to the precise details of construction herein set forth; but, Having fully described my invention, what I claim as new, and desire to secure by Letters Patent, is—

1. In a spring, the combination of two members secured together, one member adapted to be set edgewise relative to the body of a vehicle and one member having arms bent laterally therefrom for attachment to a part of a vehicle, substantially as set forth.

2. In a spring, the combination of two members having spacing-block between them, said members adapted to be set edgewise relative to the body of a vehicle and one member having arms bent laterally therefrom for attachment to a part of a vehicle, substantially as set forth.

3. A torsional vehicle-spring consisting of two spring-bars, one of said bars having laterally-bent portions for securing it to a vehicle-body, plates for securing said laterally-projecting portions to the vehicle-body, a spacing-block between said spring-bars, and devices for securing said spring-bars and spacing-block together, substantially as set forth.

4. A torsional vehicle-spring consisting of two spring-bars, a spacing-block secured between said bars, clips for embracing the edges of the spring-bars and connecting them together, and bolts passing through said clips and spacing-block, substantially as set forth.

5. The combination, with a vehicle-body, of two torsional springs attached to said body, each of said springs being composed of flat spring-bars so disposed as to have their flat faces at right angles to the vehicle-body, said spring-bars being spaced apart and secured together at their centers, one bar of each spring being connected to the running-gear of the vehicle and the other bar of each spring secured to the vehicle-body, substantially as set forth.

6. The combination, with a vehicle-body, of two torsional springs, each spring consisting of two spring-bars adapted to be spaced apart and lie parallel with each other, and the bars of each spring secured together at their centers, one bar of each spring being secured to the side-boards of the body and the other bar of each spring provided with arms for attachment to a part of the vehicle removed from the body, substantially as set forth.

In testimony whereof I have signed this specification in the presence of two subscribing witnesses.

EDWIN JARRELL.

Witnesses:
ADAM SHRIVES,
WM. MCFREDERICK.